Jan. 14, 1930.　　　A. A. REID　　　1,743,393
AIRCRAFT
Filed Oct. 30, 1929　　　2 Sheets-Sheet 1
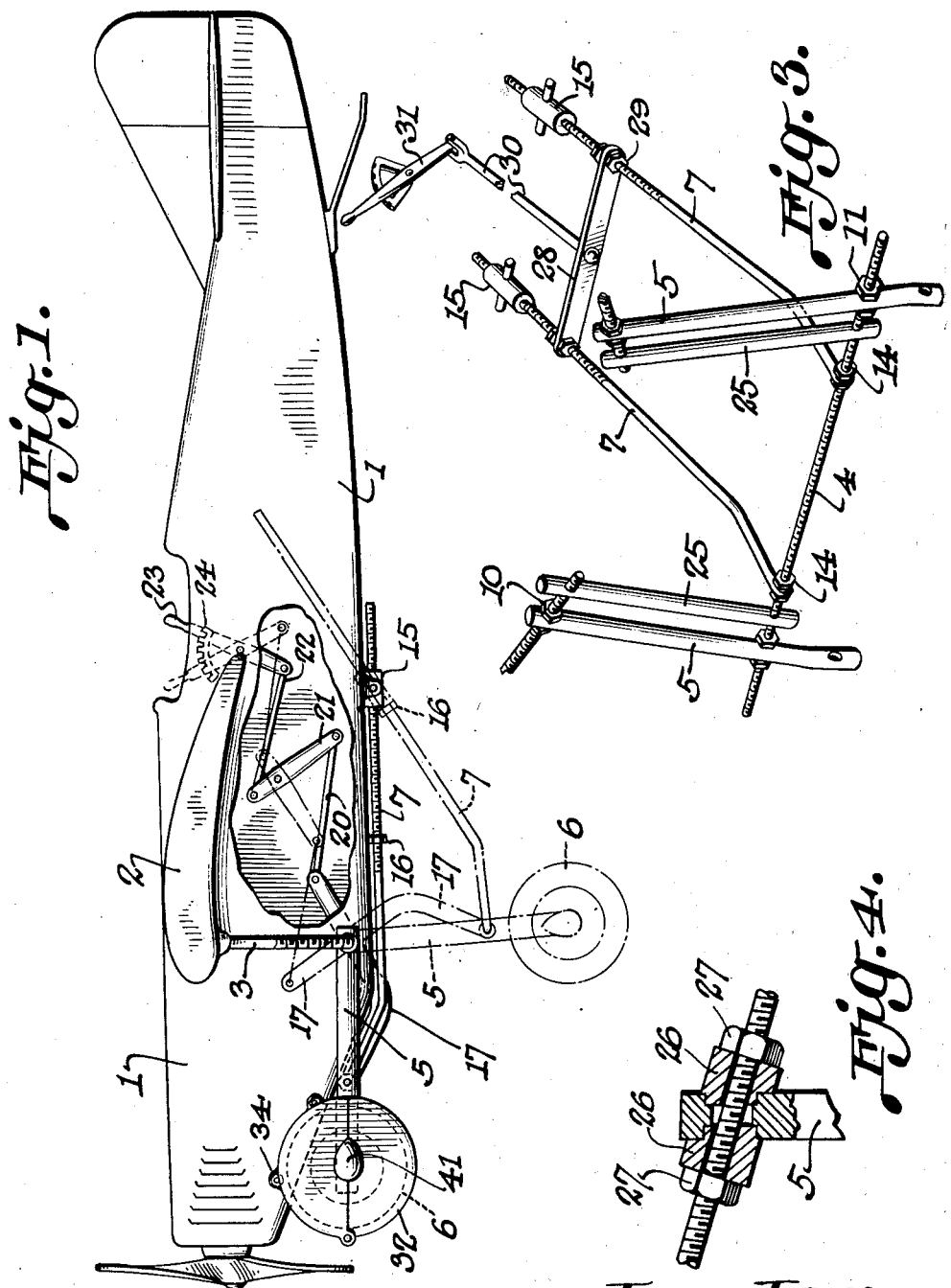

Jan. 14, 1930.  A. A. REID  1,743,393
AIRCRAFT
Filed Oct. 30, 1929   2 Sheets-Sheet 2
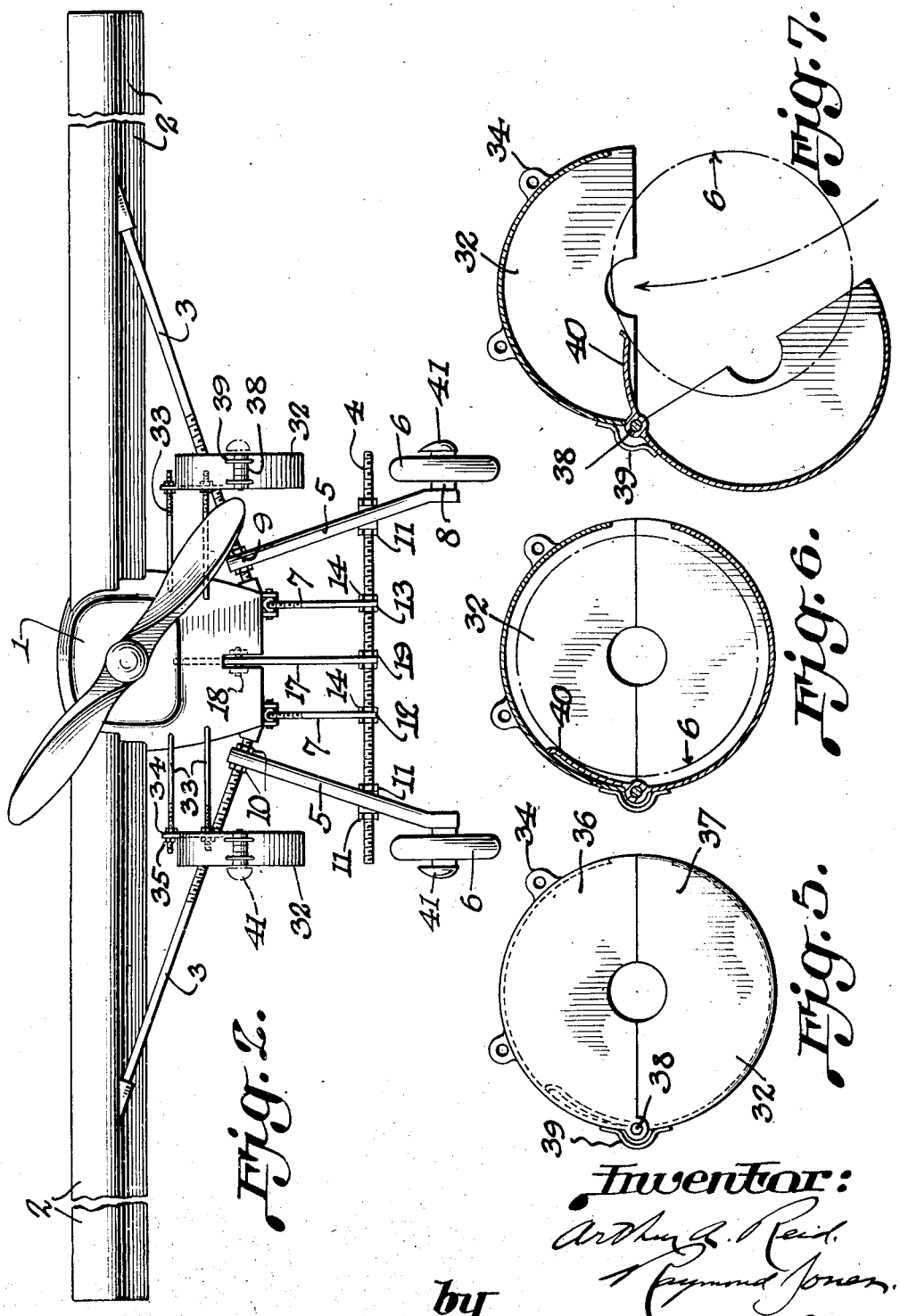

Patented Jan. 14, 1930

1,743,393

UNITED STATES PATENT OFFICE

ARTHUR ABNER REID, OF DICKSON CITY, PENNSYLVANIA

AIRCRAFT

Application filed October 30, 1929. Serial No. 403,621.

This invention relates to aircraft and more specifically to an improved landing gear of the retractible type.

One object of the invention is to provide a landing gear that may be quickly and easily folded from a normal ground contact position to a position wherein all parts lie closely adjacent the fuselage with the ground wheels close against the front end of the fuselage and above the bottom thereof.

Another object is to provide a landing gear which is comprised of a minimum number of parts, although having a maximum strength, and which is thereby economical to manufacture.

Another object is to reduce the head resistance usually offered to forward travel of airplanes to which end I provide a novel form of stream line air shield associated with the wheels in raised position.

Another object is to provide a landing gear which is pivotally supported by the wing struts and wherein the main support bars of the gear are adjustable at each end thereof for varying the spacing therebetween.

It is important in the design of a retractible landing gear to provide a structure that is applicable to aircraft bodies of standard forms without necessitating radical changes in the fuselage itself. Further, in view of the large strain imposed upon landing gears, both in take off and in landing, it is vital that a structure having a maximum strength must be provided. In addition, the control system employed for moving the landing gear to operative and retracted positions, must be simple and positive and designed to afford a quick and easy operation of the parts.

With the above and other objects in view, the invention consists in the novel construction, combination, and arrangement herein fully described, pointed out in my claims and illustrated in the accompanying drawings, in which—

Figure 1 is a side elevational view of a monoplane equipped with my improved landing gear showing the gear in its two extreme positions, the full lines indicating its folded position;

Fig. 2 is a front elevational view of the monoplane showing the landing gear in lowered operative position;

Fig. 3 shows a modified form of the controls for operating the landing gear;

Fig. 4 is a detail view of an adjusting means associated with the main gear supports;

Fig. 5 is a side elevation, and Fig. 6 a cross-sectional view of a landing wheel windshield; and Fig. 7 is a view of the windshield in open position.

Referring to the drawings in detail, I have shown in conventional form a monoplane 1 provided with wings 2 and struts 3. The landing gear comprises a main spreader bar 4, vertical support tubes 5, landing wheels 6, and rear slide support tubes 7. The wheels 6 are supported on vertical tubes 5 by means of stub axles 8.

The vertical support tubes 5 are pivotally mounted at their upper ends as at 9 upon the wing struts 3 which are provided with screw threads adjacent the fuselage. I provide stop nuts 10 for adjustably securing these tubes at a desired point on the struts. The vertical tubes are pivotally connected to the spreader bar at its opposite ends. This bar is threaded at each end and stop nuts 11 are provided for adjustably securing the vertical tubes at a desired position on said bar.

The rear slide support tubes 7 engage the spreader bar pivotally at 12 and 13 and stop nuts 14 are provided to secure said tubes at any desired point on said bar. The upper end of each slide support tube is slidably engaged in a bearing 15 pivotally mounted within an opening in the fuselage. Each slide tube is threaded a substantial distance adjacent said bearing, and a nut or stop 16 is adjustable along said threaded portion. The stop 16 provides a means to impress the rearward component of the landing force upon the bearing 15 and fuselage. This stop also provides a means to adjust the landing position of the vertical tubes 5, which position is preferably to the rear of a vertical line through the pivot point 9.

The main operating bar 17 for the landing gear is pivoted at the center of spreader bar 4 and adjustably positioned thereon by means of stop nuts 19. The operating bar is pivoted as at 18 within an opening in the fuselage bottom. The control means for the bar 17 comprise a link 20 connected to one end of a cross bar 21 pivoted on the fuselage floor. A link 22 connects the opposite end of the bar 21 to a control lever 23 which cooperates with a common form of stop segment 24.

For use with aircraft of the heavier type, such as tri-motored planes, I may find it preferable to provide a pair of auxiliary vertical support tubes 25 as shown in Fig. 3. These auxiliary tubes are connected to the wing struts and to the main spreader bar in a similar manner as shown for the vertical tubes 5.

While in Fig. 2, the tubes 5 are shown as diverging, these tubes may be arranged parallel and vertical. A special adjustment may be provided for that end of a tube 5 which intersects a strut or spreader bar 4 at any angle other than a right angle. One means for adjustment is shown in Fig. 4 in which a main tube 5 is arranged vertically. A pair of tapered washers 26 engage the tube 5 at their reduced ends, and a pair of stop nuts 27 are provided to adjustably locate the tube 5 at a desired position on the strut or on the spreader bar as may be.

A modified gear operating means is shown in Fig. 3. The use of a control bar 17 is eliminated by providing a control acting directly upon the rear slide tubes 7. A cross bar 28 is adjustably mounted at each end upon the tubes 7 by means of nuts 29. The bar 28 is connected by a link 30 to a control handle 31. A rearward pull on handle 31 will impart a forward motion to slide tubes 7, whereby to raise the landing gear.

An important feature of my invention is the provision of a novel form of windshield 32 which is adapted to receive and enclose each landing wheel when the latter is in raised position. The shields 32 are mounted on opposite sides of the fuselage nose by means of short struts 33 which engage lugs 34 on the shields. A plurality of nuts 35 are provided on each strut 33 to adjustably locate the shields in a desired position with relation to the position of the landing wheels.

Each shield 32 comprises an upper fixed half 36 and a lower movable half which is pivoted to the upper half on a hinge 38. A spring 39 is provided for moving the lower half of the shield to an open position for receiving a landing wheel. An extension 40 is provided on the lower half of the shield. As shown in Figs. 6 and 7, the extension 40 is engaged by a landing wheel entering the shield, whereby the lowered half shield is automatically raised to its closed position. I provide a stream lined hub cap 41 to further reduce head resistance.

The operation of the device is obvious. In order to raise the landing gear to the inoperative position, the handle 23 is moved rearwardly whereby to shift the landing gear forwardly and to raised position with the wheels enclosed within the windshield 32. At the same time, rear slide tubes 7 slide freely through bearings 15 as the latter rotate clockwise on their pivots. When the gear is lowered to operative position, the rear slide support tubes slide in bearings 15 until stop nuts 16 contact the respective bearings, whereby the rearward component of the landing shock is taken directly upon the bearings 15 and fuselage frame members. Any desired spacing or angularity may be given to the main support tubes 5 by means of the adjustable stop nuts 10 and 11. The landing position of the support tubes may also be varied with respect to the vertical by means of the adjustable stop nut 16.

Having fully described and disclosed the construction and operation of my retractible landing gear, what I claim as new is—

1. In an aircraft comprising wings and a fuselage, struts associated with said wings, a retractible landing gear comprising main vertical supports, said supports being pivotally mounted at their upper ends on said wing struts, and means for displacing said landing gear forwardly and upwardly to a position closely adjacent said fuselage.

2. In an aircraft comprising wings and a fuselage, struts associated with said wings, a landing gear comprising main vertical supports and a transverse spreader bar, said supports being connected at their lower ends to said spreader bar and connected at their upper ends pivotally to said struts, and means for adjusting the points of connections of said vertical supports to said spreader bar and struts.

3. In an aircraft comprising a fuselage in combination, a retractible landing gear including a pair of main support members and a transverse member, landing wheels associated with said members, a rear support member pivotally connected at one end to said transverse member, means for slidably supporting the other end of said rear support member on said fuselage, and a stop member on said rear support member for limiting the sliding movement of said last-named member.

4. In an aircraft comprising wings and a fuselage, struts associated with said wings, a retractible landing gear comprising main vertical supports, means for pivotally connecting said supports at one end to said aircraft, a transverse spreader bar engaging the other ends of said main supports, a rear support pivotally connected at one end to said spreader bar and slidably supported at the other end on said fuselage, and means for limiting the sliding movement of said rear support tube.

5. In an aircraft in combination, a fuselage, a retractible landing gear pivotally mounted on said fuselage, said landing gear including landing wheels, windshields adjacent said fuselage in position to receive said wheels in raised position, each of said shields comprising a fixed half portion and a movable half portion pivoted thereto and adapted to be operated to enclose said wheels.

6. In an aircraft in combination, a fuselage, landing wheels pivoted to said fuselage and movable to an elevated position, windshields adjacent said fuselage, each windshield comprising a portion movable to enclose one of said wheels, and means associated with said movable portion and operable by said wheel to shift said movable portion to its shielding position over said wheel.

7. In an aircraft in combination, a fuselage, landing wheels pivoted to said fuselage and movable to an elevated position, windshields adjacent said fuselage, each windshield comprising a portion movable to enclose one of said wheels, an extension on said movable portion and adapted to be engaged by a landing wheel for moving said portion to its shielding position over said wheel.

8. In an aircraft in combination, a fuselage, a landing wheel pivoted to said fuselage for movement to a raised position, a windshield for enclosing said wheel in raised position, said shield comprising a fixed portion and a movable portion pivoted thereto, yielding means for moving said movable portion to open position, and means associated with said movable portion and operable by movement of said wheel for closing said movable portion around said wheel.

In testimony whereof I affix my signature.

ARTHUR ABNER REID.